United States Patent
Smith et al.

(10) Patent No.: US 8,617,625 B2
(45) Date of Patent: Dec. 31, 2013

(54) DAIRY COMPOSITION WITH PROBIOTICS AND ANTI-MICROBIAL SYSTEM

(71) Applicants: Gary Francis Smith, Glenview, IL (US); Alice Shen Cha, Monterey, CA (US); Zuoxing Zheng, Buffalo Grove, IL (US); Michael Gerard Roman, Third Lake, IL (US); Benjamin Emanuel Dias, Chicago, IL (US)

(72) Inventors: Gary Francis Smith, Glenview, IL (US); Alice Shen Cha, Monterey, CA (US); Zuoxing Zheng, Buffalo Grove, IL (US); Michael Gerard Roman, Third Lake, IL (US); Benjamin Emanuel Dias, Chicago, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 0 days.

(21) Appl. No.: 13/709,334

(22) Filed: Dec. 10, 2012

(65) Prior Publication Data

US 2013/0164410 A1 Jun. 27, 2013

Related U.S. Application Data

(62) Division of application No. 12/413,784, filed on Mar. 30, 2009, now Pat. No. 8,349,313.

(60) Provisional application No. 61/042,555, filed on Apr. 4, 2008.

(51) Int. Cl.
*A23C 9/12* (2006.01)
*A23C 9/154* (2006.01)
*A01N 63/00* (2006.01)

(52) U.S. Cl.
USPC ............. 426/43; 426/580; 426/34; 426/42; 424/93.3; 424/93.4; 424/93.45; 435/853

(58) Field of Classification Search
USPC ........ 426/43, 580, 34, 42; 435/853; 424/93.3, 424/93.4, 93.45
See application file for complete search history.

(56) References Cited

U.S. PATENT DOCUMENTS

| | | |
|---|---|---|
| 1,902,959 A | 3/1933 | Myers |
| 3,885,048 A | 5/1975 | Liggett |
| 3,996,386 A | 12/1976 | Malkki et al. |
| 4,081,555 A | 3/1978 | Sawhill |
| 4,216,243 A | 8/1980 | Hermann |
| 4,477,478 A | 10/1984 | Tiberio et al. |
| 4,568,548 A | 2/1986 | Sprenger |
| 4,695,472 A | 9/1987 | Dunn et al. |
| 4,790,994 A | 12/1988 | Matrozza et al. |
| 4,838,154 A | 6/1989 | Dunn et al. |
| 4,880,648 A | 11/1989 | Stamer |
| 4,894,243 A | 1/1990 | Ahrné |
| 4,906,611 A | 3/1990 | Vandenbergh et al. |
| 4,911,935 A | 3/1990 | Fillaud et al. |
| 5,096,718 A | 3/1992 | Ayres et al. |
| 1,903,014 A | 3/1993 | Myers |
| 5,196,344 A | 3/1993 | Ruttan |
| 5,217,950 A | 6/1993 | Blackburn et al. |
| 5,458,876 A | 10/1995 | Monticello |
| 5,747,078 A | 5/1998 | De Jong et al. |
| 5,869,113 A | 2/1999 | Clayton et al. |
| 5,989,612 A | 11/1999 | King et al. |
| 6,027,751 A | 2/2000 | Romick et al. |
| 6,039,984 A | 3/2000 | Bowling et al. |
| 6,113,954 A | 9/2000 | Nauth et al. |
| 6,156,362 A | 12/2000 | Cirigliano et al. |
| 6,183,802 B1 | 2/2001 | Silva et al. |
| 6,207,411 B1 | 3/2001 | Ross et al. |
| 6,242,017 B1 | 6/2001 | Nauth et al. |
| 6,287,610 B1 | 9/2001 | Bowling et al. |
| 6,419,974 B1 | 7/2002 | Silva et al. |
| 6,569,474 B2 | 5/2003 | Clayton et al. |
| 6,613,364 B2 | 9/2003 | Begg et al. |
| 6,689,402 B1 | 2/2004 | Nauth et al. |
| 6,797,308 B2 | 9/2004 | Pasch et al. |
| 6,838,097 B1 | 1/2005 | Tsengas |
| 6,905,716 B2 | 6/2005 | Selmer-Olsen |
| 6,984,507 B2 | 1/2006 | Cheung |
| 6,984,508 B2 | 1/2006 | Cheung |
| 6,987,012 B2 | 1/2006 | Cheung |
| 6,989,253 B2 | 1/2006 | Cheung |
| 7,001,633 B2 | 2/2006 | Pasch et al. |
| 7,074,447 B2 | 7/2006 | Bonaventura et al. |
| 7,169,415 B2 | 1/2007 | Bowling et al. |
| 2002/0009520 A1 | 1/2002 | Clayton et al. |
| 2003/0017192 A1 | 1/2003 | Kanafani et al. |
| 2003/0206995 A1 | 11/2003 | Bowling et al. |
| 2004/0033289 A1 | 2/2004 | Selmer-Olsen |
| 2004/0052910 A1 | 3/2004 | Nakamura et al. |
| 2004/0071821 A1 | 4/2004 | Ashourian et al. |

(Continued)

FOREIGN PATENT DOCUMENTS

| | | |
|---|---|---|
| EP | 0 233 566 A2 | 8/1987 |
| EP | 0 445 857 A1 | 9/1991 |

(Continued)

OTHER PUBLICATIONS

Lilian U. Thompson et al., The effect of fermented and unfermented milks on serum cholesterol, The American Journal of Clinical Nutrition, vol. 36, Dec. 1982, pp. 1106-1111.

(Continued)

*Primary Examiner* — Thaian N Ton

(74) *Attorney, Agent, or Firm* — Fitch, Even, Tabin & Flannery LLP

(57) ABSTRACT

Dairy compositions are provided having a high pH, of about 4.8 to about 6.2, comprising desirable probiotic cultures as well as an anti-microbial system for inhibiting undesirable pathogenic and/or spoilage microbial growth without significantly reducing the beneficial effect of the probiotic cultures.

9 Claims, 1 Drawing Sheet

(56) References Cited

U.S. PATENT DOCUMENTS

| | | |
|---|---|---|
| 2004/0122095 A1 | 6/2004 | Bonaventura et al. |
| 2004/0208974 A1 | 10/2004 | Calvert, Jr. |
| 2004/0228949 A1 | 11/2004 | Pasch et al. |
| 2004/0265289 A1 | 12/2004 | Elsser et al. |
| 2005/0084593 A1 | 4/2005 | Calvert, Jr. |
| 2005/0106662 A1 | 5/2005 | DeVuyst et al. |
| 2005/0112238 A1 | 5/2005 | Dias et al. |
| 2005/0136165 A1 | 6/2005 | Cirigliano et al. |
| 2005/0143321 A1 | 6/2005 | Vardosanidze et al. |
| 2005/0175745 A1 | 8/2005 | Zawistowski |
| 2005/0238631 A1 | 10/2005 | Burwell |
| 2005/0255192 A1 | 11/2005 | Chaudhry et al. |
| 2006/0018867 A1 | 1/2006 | Kawasaki et al. |
| 2006/0024414 A1 | 2/2006 | Turek et al. |
| 2006/0182846 A1 | 8/2006 | Trecker et al. |
| 2006/0216372 A1 | 9/2006 | Crepel et al. |
| 2006/0240149 A1 | 10/2006 | Konkoly et al. |
| 2006/0251633 A1 | 11/2006 | Salvadori et al. |
| 2007/0020328 A1 | 1/2007 | Lin |

FOREIGN PATENT DOCUMENTS

| | | |
|---|---|---|
| EP | 0 446 244 A1 | 1/1992 |
| EP | 0 518 445 A1 | 12/1992 |
| EP | 0 374 823 B1 | 12/1993 |
| EP | 0 340 212 B1 | 6/1994 |
| EP | 0 608 944 B1 | 10/1997 |
| EP | 0 970 613 A1 | 1/2000 |
| EP | 1 195 095 A2 | 4/2002 |
| EP | 1 210 880 A1 | 6/2002 |
| EP | 1 065 937 B1 | 11/2002 |
| EP | 0 579 730 B1 | 2/2003 |
| EP | 1 352 570 A1 | 10/2003 |
| EP | 1 532 864 A1 | 5/2005 |
| EP | 1 535 519 A1 | 6/2005 |
| EP | 1 450 608 B1 | 10/2005 |
| EP | 1 604 647 A1 | 12/2005 |
| EP | 1 621 085 A1 | 2/2006 |
| EP | 1 690 456 A1 | 8/2006 |
| GB | 2 358 120 A | 7/2001 |
| GR | 970403277 T | 3/1998 |
| JP | 6-271401 A | 9/1994 |
| WO | 88/03763 A1 | 6/1988 |
| WO | 92/22221 A1 | 12/1992 |
| WO | 93/18179 A1 | 9/1993 |
| WO | 95/01729 A1 | 1/1995 |
| WO | 98/16124 A1 | 4/1998 |
| WO | 98/44090 A1 | 10/1998 |
| WO | 99/04649 A1 | 2/1999 |
| WO | 99/20098 A1 | 4/1999 |
| WO | 99/51105 A1 | 10/1999 |
| WO | 00/41491 A2 | 7/2000 |
| WO | 00/72691 A2 | 12/2000 |
| WO | 02/16629 A1 | 2/2002 |
| WO | 02/087328 A2 | 11/2002 |
| WO | 02/102168 A1 | 12/2002 |
| WO | 03/001930 A2 | 1/2003 |
| WO | 03/045987 A2 | 6/2003 |
| WO | 03/070012 A1 | 8/2003 |
| WO | 2004/075643 A2 | 9/2004 |
| WO | 2004/075644 A2 | 9/2004 |
| WO | 2005/063030 A1 | 7/2005 |
| WO | 2005/074726 A1 | 8/2005 |
| WO | 2005/079210 A2 | 9/2005 |
| WO | 2005/104878 A1 | 11/2005 |
| WO | 2006/067825 A2 | 6/2006 |
| WO | 2006/097107 A1 | 9/2006 |
| WO | 2007/001185 A1 | 1/2007 |

OTHER PUBLICATIONS

C. G. Vinderola et al., Survival of probiotic microflora in Argentinian yoghurts during refrigerated storage, Food Research International, vol. 33, 2000, pp. 97-102.

Sharon Gerdes, Yogurt: Enhancing a Superfood, retrieved online on Oct. 26, 2011 from http://www.foodproductdesign.com/, posted on Mar. 5, 2007, 3 pages.

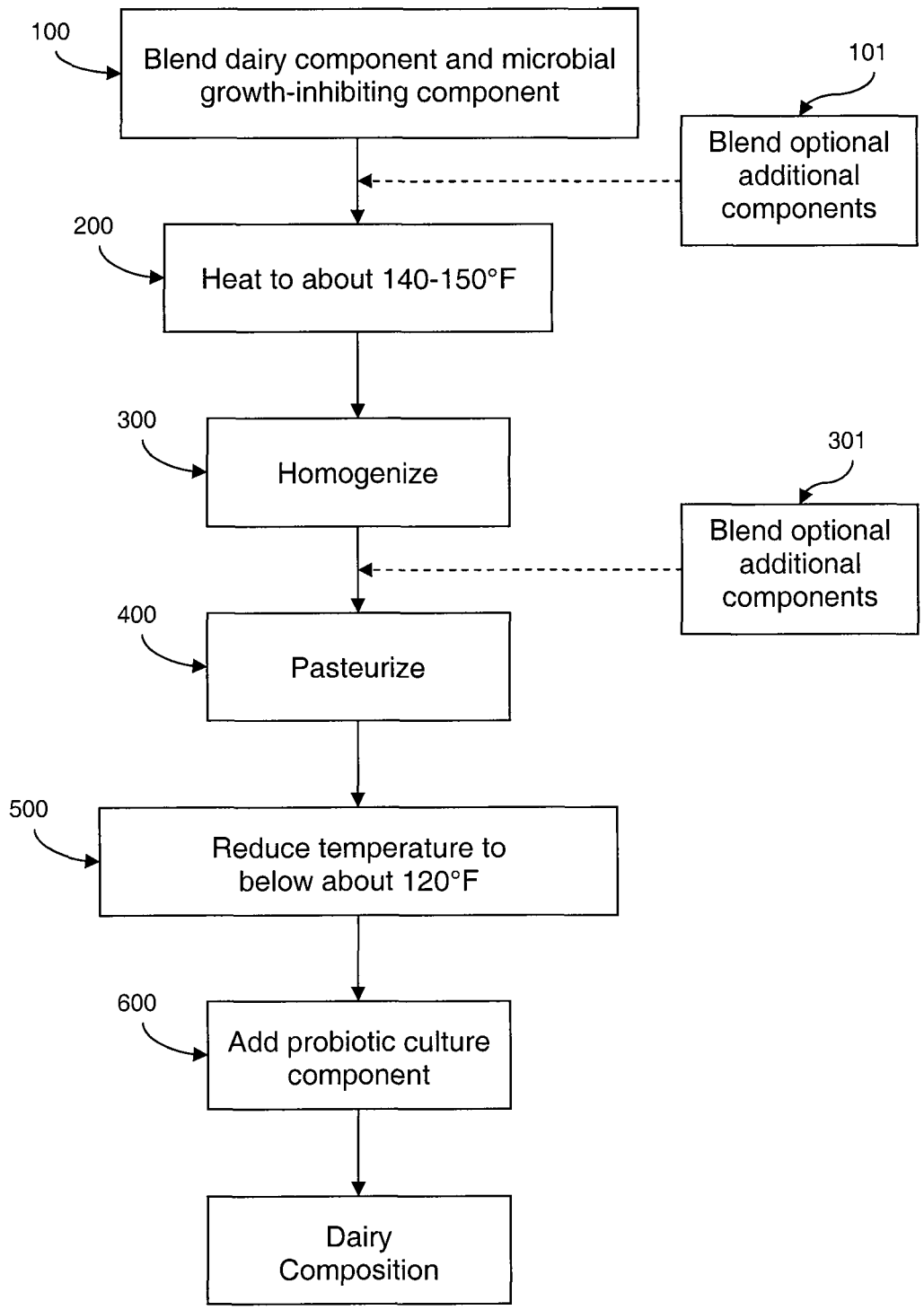

DAIRY COMPOSITION WITH PROBIOTICS AND ANTI-MICROBIAL SYSTEM

CROSS-REFERENCE TO RELATED APPLICATIONS

This application is a divisional of prior application Ser. No. 12/413,784, filed on Mar. 30, 2009, which claims the benefit of the filing date of U.S. Provisional Application 61/042,555, which are all hereby incorporated herein by reference in their entirety.

FIELD OF THE INVENTION

The present invention is directed to dairy compositions and, in particular, to dairy compositions having a high pH (i.e., about 4.8 to about 6.2) comprising desirable probiotic cultures as well as an anti-microbial

BACKGROUND OF THE INVENTION

Probiotics are dietary supplements containing potentially beneficial bacteria or yeast cultures. Probiotics are intended to bolster the body's naturally occurring intestinal flora and to help natural flora to maintain and/or reestablish themselves. Probiotics are sometimes recommended by doctors and nutritionists to aid in digestion, especially if the natural flora has been destroyed through antibiotic treatments, illness, or other means.

Investigation into uses and benefits for probiotics is ongoing, but a number of benefits and therapies have been suggested. For instance, it has been suggested that certain probiotics may be useful in managing lactose intolerance. Lactic acid bacteria, common probiotics, convert lactose into lactic acid; thus their ingestion may help to break down lactose to an extent that allows lactose intolerant individuals to tolerate more lactose than otherwise possible. It has also been suggested that probiotics may be advantageous in prevention of colon cancer, since some probiotics have demonstrated anti-mutagenic effects in the lab setting, apparently due to their ability to bind with heterocyclic amines (carcinogenic substances formed in cooked meat) or by decreasing the activity of certain enzymes that generate carcinogens in the digestive system. Probiotics may also be useful in lowering cholesterol levels, presumably by breaking down bile in the gut, thus inhibiting its reabsorption (which enters the blood as cholesterol). Probiotics may also lower blood pressure and improve immune function (possibly by means of competitively inhibiting harmful bacterial growth, increasing the number of antibody-producing plasma cells, increasing or improving phagocytosis, and/or increasing the proportion of T lymphocytes and Natural Killer cells). Foods containing probiotics have also been shown or suggested to have a variety of health effects, including decreasing the incidence of respiratory tract infections and dental caries in children, reducing the incidence of peptic ulcers in adults when used in combination with standard medical treatments, prevention of acute diarrhea, reducing inflammation and hypersensitivity responses, and improving mineral absorption.

Food products and dietary supplements containing viable probiotic cultures have become increasingly popular due to the suggested health benefits associated with such products. The most common form for probiotics are dairy products and probiotic fortified foods such as yogurt and cheese.

For example, yogurt is a fermented dairy product made by adding lactic acid bacterial cultures to milk, which causes the conversion of sugars (including lactose) and other carbohydrates into lactic acid. It is this process of creating lactic acid that provides the characteristic low pH (about 4.2) and resultant sour taste of yogurt and many other fermented dairy products. To offset the natural sourness of yogurt, it can be sweetened, flavored, or packaged in containers with fruit or fruit jam. Therefore, yogurt manufacturers generally add high amounts of sugar or sugar substitutes to compensate for the sour taste, which makes the product more palatable for many consumers, but results in higher calories. Additionally, the low pH and sourness of yogurt tends to be incompatible with many "ice cream-type" flavors, including for example, vanilla, chocolate, fudge, caramel, marshmallow, nut, coconut, peanut butter, mint, fruit, dulce de leche, butter pecan, cookie dough, and the like as well as combinations thereof. Conversely, a high pH product (i.e., about 4.8 to about 6.2), which enables better tasting ice cream-type flavors, is associated with a longer shelf life of incorporated probiotic cultures. However, high pH is also associated with an increased and undesirable susceptibility to pathogenic and/or spoilage microbial growth.

Natural cheese has a different anti-microbial system. The growth of undesirable pathogenic and/or spoilage microorganisms is prevented in cheese by a combination of acid developed by the starter cultures, the salt content, and relatively low moisture. The production of other antimicrobial agents by the starter lactic cultures may further boost the antimicrobial properties of the cheese.

Thus, there is a need for a dairy product, which, like yogurt or fresh cheese, is capable of providing beneficial probiotic cultures, but which has a high pH compatible with many desirable ice cream-type and savory flavors and is capable of extending the shelf life of the product. There is a need to provide such a high pH dairy product with an anti-microbial system capable of inhibiting undesirable pathogenic and/or spoilage microbial growth without significantly reducing the viability and beneficial effect of the probiotic cultures. Further, there is a need for an anti-microbial system, which remains effective when the product is subjected to temperature abuse, and which assists in preventing undesirable gas production by hetero-fermentative probiotic microorganisms. The present invention provides these and other benefits, as will be apparent from the following description of embodiments of the present invention.

SUMMARY OF THE INVENTION

According to a first aspect the present invention, a dairy composition having an aqueous continuous phase is provided, the dairy composition comprising a dairy component, a microbial growth-inhibiting component dispersed in the dairy component, and a probiotic culture component comprising probiotic cultures dispersed in the dairy component, wherein the dairy composition has a pH of about 4.8 to about 6.2 and the microbial growth-inhibiting component is selected from the group consisting of sorbic acid and salts thereof and is present in an amount that is effective to inhibit undesirable microbial growth and to permit the probiotic cultures of the probiotic culture component to remain substantially viable. In one form, the microbial growth-inhibiting component is present in an amount of about 0.03% to about 0.15% by weight of the dairy composition, preferably about 0.04% to about 0.08% by weight of the dairy composition.

According to another aspect of the present invention, a dairy product is provided comprising a dairy composition having an aqueous continuous phase and a pH of about 4.8 to about 6.2. The dairy composition comprises a dairy component having dispersed therein a microbial growth-inhibiting component and a probiotic culture component comprising probiotic cultures, wherein the microbial growth-inhibiting component is present in an amount effective to inhibit undesirable microbial growth but to permit the probiotic cultures of the probiotic culture component to remain substantially viable. In one form, the microbial growth-inhibiting component is selected from the group consisting of sorbic acid and salts thereof. In another form, the microbial growth-inhibiting component comprises sorbic acid in an amount of about 0.03% to about 0.15% by weight of the dairy product, preferably about 0.04% to about 0.08% by weight of the dairy product.

According to yet another aspect of the invention, a method of forming a dairy product is provided, which comprises preparing a dairy composition having an aqueous continuous phase and a pH of about 4.8 to about 6.2, pasteurizing the dairy composition, cooling the dairy composition to a temperature at which a probiotic culture component can survive in the dairy composition, dispersing a probiotic culture component comprising probiotic cultures in the dairy composition, and dispersing an effective amount of a microbial growth-inhibiting component in the dairy composition such that undesirable microbial growth is inhibited, but the probiotic cultures of the probiotic culture component remain substantially viable.

BRIEF DESCRIPTION OF THE DRAWINGS

FIG. 1 is a flow diagram view illustrating a general method of forming the dairy product of the invention.

DETAILED DESCRIPTION

The present invention provides a dairy product such as a dairy cup, dairy bar, or cheese product for example, which, like yogurt, is capable of providing beneficial probiotic cultures. However, unlike yogurt, which has a low pH (about 4.2), the dairy product of the present invention has a higher pH (i.e., preferably about 4.8 to about 6.2, more preferably about 5.0 to about 6.0), which promotes probiotic culture viability while also being compatible with a greater variety of flavors, particularly many desirable ice cream-type flavors and savory flavors. The dairy product of the present invention also advantageously includes an anti-microbial system capable of inhibiting undesirable pathogenic microbial growth and toxin production and/or spoilage microflora growth while at the same time leaving beneficial probiotic cultures substantially viable. As used herein, "capable of inhibiting undesirable microbial growth" refers to an ability keep the increase in total count of background flora to less than 3 log units over at least three days at 86° F. and/or the ability to allow at least a 24 hour delay in toxin production in samples inoculated with C. botulinum at 86° F. (by toxin detection standard assay procedures for C. botulinum as outlined by the U.S. Food and Drug Administration (FDA). "Substantially viable" refers to a reduction in total probiotic count of less than one log unit over eight weeks, and preferably less than two log units over 16 weeks.

Preferably, the anti-microbial system comprises sorbic acid and/or a salt thereof. The sorbic acid and/or salt is preferably present in an amount of at least about 0.03%, more preferably about 0.03% to about 0.15%, and most preferably in about 0.04% to about 0.08%, by weight of the dairy product.

We have found that the addition of probiotic microorganisms advantageously improves the anti-microbial properties of the present system. Although not wishing to be limited by theory, it is presently believed that this is due to a lowering of the pH of the system when under temperature abuse, preferential growth of the desirable probiotic microorganisms and out competition of the undesirable pathogenic and/or spoilage microorganisms, and/or, depending on the probiotic microorganisms, production of anti-microbial compounds by the probiotic microorganisms. The anti-microbial system of the present invention also advantageously remains effective when the dairy product is subjected to temperature abuse (i.e., above about 86° F.) for up to about 7 days and aids in the prevention of undesirable gas production by heterofermentative probiotic microorganisms.

According to one aspect of the present invention, a dairy composition having an aqueous continuous phase is provided, the dairy composition comprising a dairy component, a microbial growth-inhibiting component dispersed in the dairy component, and a probiotic culture component comprising probiotic cultures dispersed in the dairy component, wherein the dairy composition has a pH of about 4.8 to about 6.2 and the microbial growth-inhibiting component is selected from the group consisting of sorbic acid and salts thereof and is present in an amount that is effective to inhibit undesirable microbial growth and to permit the probiotic cultures of the probiotic culture component to remain substantially viable. In one form, the microbial growth-inhibiting component is present in an amount of at least about 0.03%, more preferably about 0.03% to about 0.15%, and most preferably about 0.04% to about 0.08%, by weight of the dairy composition.

According to another aspect of the present invention, a dairy product is provided comprising a dairy composition having a pH of about 4.8 to about 6.2. The dairy composition comprises a dairy component having dispersed therein a microbial growth-inhibiting component and a probiotic culture component comprising probiotic cultures, and the microbial growth-inhibiting component is present in an amount effective to inhibit undesirable microbial growth but to permit the probiotic cultures of the probiotic culture component to remain substantially viable. Preferably, the microbial growth-inhibiting component comprises sorbic acid and/or a salt thereof in an amount of at least about 0.03%, more preferably about 0.03% to about 0.15%, and most preferably about 0.04% to about 0.08%, by weight of the dairy composition.

According to yet another aspect of the invention, a method of forming a dairy product is provided, which comprises preparing a dairy composition having a pH of about 4.8 to about 6.2, pasteurizing the dairy composition, cooling the dairy composition to a temperature at which a probiotic culture component can survive when dispersed in the dairy composition (generally in the range of 40° F. to about 120° F.), dispersing a probiotic culture component comprising probiotic cultures in the dairy composition, and dispersing an effective amount of a microbial growth-inhibiting component in the dairy composition such that undesirable microbial growth is inhibited, but the probiotic cultures of the probiotic culture component remain viable.

The dairy component may be present in any suitable amount, preferably at least about 5%, and generally about 75% to about 90% by weight of the dairy composition. The dairy component may include any suitable dairy source including, for example, milk, reduced-fat milk, skim milk, dairy powder, non-fat dry milk, milk protein concentrate/isolate, condensed milk, whey, whey protein concentrate, ultrafiltered (UF) concentrated milk, and the like.

The microbial growth-inhibiting component may comprise any suitable anti-microbial source capable of inhibiting pathogenic and/or spoilage microbial growth without substantially reducing the viability of the probiotic cultures. Many common anti-microbial systems (including nisin, for example), although effective in inhibiting pathogenic and/or spoilage microbial growth, will undesirably effect the viability of the incorporated probiotic cultures. We have found that incorporating sorbic acid and/or salts thereof in accordance with the present invention, surprisingly inhibits undesirable pathogenic microbe growth and toxin production and spoilage microflora growth while simultaneously leaving the beneficial probiotic cultures substantially viable. Thus, in one preferred form, the microbial growth-inhibiting component comprises sorbic acid and/or a salt thereof in an amount of at least about 0.03%, more preferably about 0.03% to about 0.15%, and most preferably about 0.04% to about 0.08%, by weight of the dairy composition.

Suitable probiotic cultures for use with the present invention may be readily selected by one of ordinary skill in the art and may include, for example, various species of the genera *Bifidobacterium, Lactobacillus*, and *propionibacteria* such as: *Bifidobacterium animalis* subsp. *lactis; Bifidobacterium bifidum; Bifidobacterium breve; Bifidobacterium infantis; Bifidobacterium longum; Lactobacillus acidophilus; Lactobacillus casei; Lactobacillus plantarum; Lactobacillus reuteri; Lactobacillus rhamnosus*; and the like. A species of yeast, *Saccharomyces boulardii*, may also be used as a probiotic. Particularly preferred probiotic cultures include *Bifidobacterium lactis* B1-04, *Bifidobacterium lactis* BB-12 (CHN), and *L. reuteri* (SD 55730-Biogaia).

The probiotic cultures are preferably present in an amount of approximately $1\times10^9$ cfu/per serving. In one form, a serving size is at least about 20 g, preferably at about 100 g to about 240 g. As will be readily apparent to one of ordinary skill in the art, the amount of probiotic cultures to be incorporated depends on a number of factors including, for example, serving size, type of probiotic culture, and the expected loss rate over shelf life. Thus, in one preferred form, probiotic cultures are incorporated in the dairy composition at a level of about $1\times10^4$ cfu/g to about $1\times10^9$ cfu/g.

The dairy composition may optionally include one or more additional components including, for example, but not limited to, flavor(s), fat(s), protein(s), prebiotic(s) sweetener(s), thickener(s), pH adjuster(s), colorant(s), vitamin(s), mineral(s) calcium, bulking agent(s), spices, characterizing ingredient(s), such as cocoa, salt, fruit pieces, puree, or juice, botanical extracts, and/or combinations thereof.

The flavor component may be added in any suitable amount and may include any suitable flavor and/or aroma source. In one form, the flavor component is an ice cream-type flavor, such as vanilla, chocolate, fudge, caramel, marshmallow, nut, coconut, peanut butter, mint, fruit, dulce de leche, butter pecan, cookie dough, and the like, as well as combinations thereof. Thus, the present invention advantageously provides a new way to enjoy a dairy product with cultures, which enables a more appealing flavor profile than conventional fermented dairy products and satisfies appropriate microbial food product safety precautions.

Fat components suitable for use with the present invention may include any suitable fat source containing any edible natural, synthetic, or modified solid fat, liquid oil, fat substitute, obtained from any suitable plant, animal, or other source. In a preferred form, the fat component is milkfat. Preferably, fat is present in the dairy composition in an amount of less than about 20%, more preferably less than about 10%, and most preferably less than about 5%, by weight of the dairy composition.

The protein component may include any suitable protein source, including, for example, whey protein (e.g. whey protein concentrate or isolate) milk protein (e.g. non-fat dry milk, milk protein concentrate or isolate), soy protein (e.g. soy protein concentrate or isolate), UF milk, concentrated milk, and/or combinations thereof. Preferably, the protein is present in the dairy composition in an amount of at least about 3%, and, in some cases, as much as 10% or more by weight of the dairy composition.

Suitable prebiotic components for use with the present invention may include, for example, inulin and oligosaccharides such as manno-oligosaccharides, galacto-oligosaccharides, and fructo-oligosaccharides. The prebiotic component may be incorporated in any suitable amount, generally up to about 3%, and, in some cases, up to about 10%, by weight of the dairy composition.

Sweetener components suitable for use with the invention include, for example, natural sweeteners such as sucrose, glucose, fructose, maltose, lactose, galactose, high fructose corn-syrup, artificial intensive sweeteners, and sugar alcohols. Natural sweeteners may be incorporated in any suitable amount, generally up to about 20%, by weight of the dairy composition. Artificial intensive sweeteners and/or sugar alcohols may be incorporated in any suitable amount, generally about 0.001% to about 0.03%.

Suitable thickening components may include, for example, starches and gums. The thickening component may be incorporated in any suitable amount (for a starch, generally about 1.0% to about 2.5% and for a gum, generally about 0.1% to about 0.5%, by weight of the dairy composition).

Preferably a pH adjusting component, such as lactic acid, citric acid, fumaric acid, hydrochloric acid, sodium acid sulfate and calcium acid sulfate is incorporated in an amount sufficient to adjust the pH of the dairy composition to a desirable pH, preferably about 4.8 to about 6.2, and more preferably about 5.0 to about 6.0. Alternatively, all or part of the dairy composition may be cultured to the appropriate pH. In the case of a cheese-type product, the addition of rennet may be utilized.

With reference to FIG. 1, a process is illustrated for preparing a dairy product according to one aspect of the present invention. While a preferred process is disclosed, it will be understood by those of skill in the art, that the identified steps may be performed in a different order. A dairy component and a microbial growth-inhibiting component are blended at step 100 such that the microbial growth-inhibiting component is homogeneously dispersed in the dairy component. Optionally, additional components including, but not limited to, flavor(s), fat(s), protein(s), prebiotic(s) sweetener(s), thickener(s), pH adjuster(s), colorant(s), vitamin(s), mineral(s) calcium, bulking agent(s), spices, characterizing ingredient(s) such as cocoa or salt, and/or combinations thereof may also be blended with the dairy component and the microbial growth-inhibiting component at step 101.

Next, the blend is heated to a pasteurization temperature at step 200. At step 300, the blend is homogenized. If the optional additional components are not added at step 101, they may be added after homogenization, at step 301. In the case of a non-pasteurized cheese product, the pasteurization step is omitted.

Next, the blend is cooled to a temperature at which the probiotic cultures can survive when incorporated in the blend and the viscosity of the blend is sufficiently low to allow good mixing of the probiotic cultures, (generally in the range of 40° F. to about 120° F.). Finally, after adding the probiotic culture, the blend may be cooled further and/or filled into cups or formed into bars and stored, preferably at a temperature of less than about 45° F.

EXAMPLES

The following examples further illustrate various features of the invention, but are not intended to limit the scope of the invention as set forth in the appended claims. Unless otherwise noted, all percentages and ratios are by weight. All references cited in the present specification are hereby incorporated by reference.

Example 1

The following example demonstrates the ability of inoculated probiotic cultures to remain substantially viable in the presence of sorbic acid. Dairy product Samples 1-4 were prepared in accordance with the present invention having the formula shown in Table 1A.

TABLE 1A

| Ingredient | % by weight of composition |
|---|---|
| Skim milk | 75.6 |
| Butter | 3.6 |
| WPC 80 | 2.45 |
| Inulin | 2.3 |
| Sucrose | 13.0 |
| Food Grade 5N HCl | An amount effective to achieve a final pH of about 5.0-5.9 (generally ~0.25) |
| Starch | 2.0 |
| Gum | 0.5 |
| Flavor | 0.2 |
| Sorbic acid | 0.08 |
| Probiotic culture *B. lactis* Bl-04 (Danisco) | $9 \times 10^6$ cfu/g |

The pH of the Samples 1-4 was adjusted to the range of about 5.0 to 5.9, as set forth in Table 1B. The samples were stored for 8 weeks at refrigerated temperatures (i.e., less than about 45° F.). After that time, all four samples exhibited beneficial viable probiotic culture levels above about $1 \times 10^5$ cfu/g. The results are shown in Table 1B.

A comparison sample, Sample 5 was prepared having the same formula as Samples 1-4, but with additional acid added to adjust the pH to about 4.2. As shown in Table 1B, the comparison sample experienced an undesirable >2 log reduction in total probiotic cultures over the same period of time.

Samples 1-4 were prepared with vanilla and chocolate flavors. In a panel taste test, Samples 1-4 were perceived to provide significantly enhanced flavor characteristics over vanilla and chocolate yogurt, which is at a lower pH.

After 12 months of refrigerated storage, the samples of the present invention (Samples 1-4) had effectively no undesirable microbial growth and maintained the enhanced flavor characteristics. The probiotic cultures had naturally diminished to essentially zero in that time.

Example 2

The following example further demonstrates the ability of inoculated probiotic cultures to remain substantially viable in the presence of sorbic acid. Dairy product samples 6 and 7 were prepared according to the formula shown in Table 1A, except that, the probiotic culture *B. lactis* B1-04 (Danisco) was replaced with a different culture. In Sample 6, the probiotic culture *Bifidobacterium lactis* BB-12 (Chr. Hansen) was added at a level of about $5.4 \times 10^6$ cfu/g, and in Sample 7, the probiotic culture *L. reuteri* (BioGaia) was added at a level of about $1 \times 10^7$ cfu/g.

The samples were adjusted to a pH of about 5.9. The samples were stored for 9 weeks at refrigerated temperatures (i.e., less than about 45° F.). After that time the samples exhibited beneficial viable probiotic culture levels above about $1 \times 10^5$ cfu/g. The results are shown in Table 2. The amounts shown in Table 2 are cfu/g unless stated otherwise.

TABLE 2

| Sample | pH | $T_0$ | 1 wk | 3 wks | 6 wks | 9 wks |
|---|---|---|---|---|---|---|
| 6 | 5.9 | $5.4 \times 10^6$ | $3.5 \times 10^6$ | $1.4 \times 10^6$ | $8.3 \times 10^5$ | $1.6 \times 10^5$ |
| 7 | 5.9 | $2.0 \times 10^7$ | $1.3 \times 10^7$ | $1.2 \times 10^7$ | $5.6 \times 10^6$ | $3.4 \times 10^6$ |

Example 3

The following examples demonstrate the inhibition of pathogenic microbe growth in sorbic acid-containing dairy product samples as well as the effectiveness of probiotic cultures as a secondary barrier against such growth. Dairy product samples 8-10 were prepared according to the formulas shown in Table 3.

TABLE 3

| Ingredient | Sample 8 % by weight of Composition | Sample 9 % by weight of Composition | Sample 10 % by weight of composition |
|---|---|---|---|
| Skim milk | 75.6 | 75.6 | 75.6 |
| Butter | 3.6 | 3.6 | 3.6 |
| WPC 80 | 2.45 | 2.45 | 2.45 |
| Inulin | 2.3 | 2.3 | 2.3 |
| Sucrose | 13.0 | 13.0 | 13.0 |
| Food Grade 5N HCl | An amount effective to achieve a final pH | An amount effective to achieve a final pH | An amount effective to achieve a final pH |

TABLE 1B

| Sample | pH | $T_0$ | 1 wk | 2 wks | 3 wks | 4 wks | 8 wks |
|---|---|---|---|---|---|---|---|
| 1 | 5.5 | $9.0 \times 10^6$ | $9.4 \times 10^6$ | $9.5 \times 10^6$ | $4.0 \times 10^5$ | $1.2 \times 10^6$ | $1.0 \times 10^6$ |
| 2 | 5.5 | $9.8 \times 10^6$ | $1.4 \times 10^7$ | $1.2 \times 10^7$ | $8.2 \times 10^6$ | $5.7 \times 10^6$ | $4.9 \times 10^6$ |
| 3 | 5.0 | $7.8 \times 10^6$ | $7.8 \times 10^6$ | $5.0 \times 10^6$ | $5.5 \times 10^6$ | $4.3 \times 10^6$ | $1.7 \times 10^6$ |
| 4 | 5.9 | $8.7 \times 10^6$ | $9.7 \times 10^6$ | $7.1 \times 10^6$ | $6.7 \times 10^6$ | $5.4 \times 10^5$ | $2.7 \times 10^6$ |
| 5 | 4.2 | $8.3 \times 10^6$ | $8.7 \times 10^6$ | $4.2 \times 10^5$ | $6.5 \times 10^4$ | $1.6 \times 10^4$ | $1.0 \times 10^4$ |

TABLE 3-continued

| Ingredient | Sample 8 % by weight of Composition | Sample 9 % by weight of Composition | Sample 10 % by weight of composition |
|---|---|---|---|
| | of about 5.0-5.9 (generally ~0.25) | of about 5.0-5.9 (generally ~0.25) | of about 5.0-5.9 (generally ~0.25) |
| Starch | 2.0 | 2.0 | 2.0 |
| Gum | 0.5 | 0.5 | 0.5 |
| Flavor | 0.2 | 0.2 | 0.2 |
| Sorbic acid | 0.1 | 0.1 | 0.1 |
| Probiotic culture *Bifidobacterium lactis* BB-12 (Chr. Hansen) | 0.0 | $5.1 \times 10^7$ cfu/g | 0.0 |
| Probiotic culture *L. reuteri* (BioGaia) | 0.0 | 0.0 | $7.2 \times 10^7$ cfu/g |

A pathogen growth challenge study was conducted on the samples whereby *C. botulinum* was inoculated into the samples as a proteolytic suspension of $1.5 \times 10^5$ spores/ml and allowed to grow stored at 86° F. for 7 days. The initial proteolytic botulinum inoculum count (EYA) was 160 spores/g in the inoculated samples and <10 spores/g in the uninoculated samples. Background flora count and presence of *C. botulinum* toxin were tested by standard assay procedures as outlined by the FDA. The results for Samples 8-10 are shown in Tables 4-6, respectively.

TABLE 4

| Sample 8 | $T_0$ | 1 day | 2 days | 3 days | 4 days | 5 days | 6 days | 7 days |
|---|---|---|---|---|---|---|---|---|
| pH | 5.75 | 5.73 | 5.70 | 5.69 | 5.68 | 5.66 | 5.65 | 5.63 |
| Aerobic background count (BHI/30C) (cfu/g) | <10 | 10* | NT | <10 | NT | 110* | NT | $<1 \times 10^{6*}$ |
| *Lactobacillus* background count (Anaerobic MRS/30C) (cfu/g) | NT | <10 | NT | <10 | NT | <10 | NT | <10 |
| Bioassay toxin results (− no toxin, + toxin present): | | | | | | | | |
| Uninoculated | − | − | − | − | − | − | − | − |
| Proteolytic inoculated | − | − | − | − | − | − | − | − |

*Bacillus* spp.
NT = Not Tested

TABLE 5

| Sample 9 | $T_0$ | 1 day | 2 days | 3 days | 4 days | 5 days | 6 days | 7 days |
|---|---|---|---|---|---|---|---|---|
| pH | 5.74 | 5.59 | 5.44 | 5.40 | 5.34 | 5.18 | 5.15 | 5.01 |
| Aerobic background count (BHI/30C) (cfu/g) | <10 | 10* | NT | <10 | NT | <10 | NT | <10 |
| Bioassay toxin results (− no toxin, + toxin present): | | | | | | | | |
| Uninoculated | − | − | − | − | − | − | − | − |
| Proteolytic inoculated | − | − | − | − | − | − | − | − |

*Bacillus* spp.
NT = Not Tested

TABLE 6

| Sample 10 | $T_0$ | 1 day | 2 days | 3 days | 4 days | 5 days | 6 days | 7 days |
|---|---|---|---|---|---|---|---|---|
| pH | 5.73 | 5.62 | 5.53 | 5.44 | 5.51 | 5.44 | 5.44 | 5.30 |
| Aerobic background count (BHI/30C) (cfu/g) | <10 | <10 | NT | <10 | NT | <10 | NT | <10 |
| Proteolytic botulinum inoculum count (EYA) (spores/g): | | | | | | | | |
| Uninoculated | <10 | | | | | | | |
| Uninoculated | − | − | − | − | − | − | − | − |
| Proteolytic inoculated | − | − | − | − | − | − | − | − |

NT = Not Tested

As shown in Tables 4-6, no toxin developed in the Samples at any time during the 7-day study. Additionally, in the samples that contained probiotic cultures (Samples 9 and 10), background flora counts remained low, generally <10 cfu/g. Whereas, in Sample 8, the control sample which contained no probiotic cultures, an outgrowth of background *Bacillus* spp was observed, rising to about 110 cfu/g by day 5 and to about >1.0×10$^6$ cfu/g by day 7. This suggested that the probiotic cultures provided a secondary barrier to background growth.

A set of comparison dairy product samples (Samples 11-13) were prepared with the same formula as Samples 8-10, respectively, except that the sorbic acid was excluded from all three samples. A second pathogen growth challenge study was conducted. In all uninoculated samples, the initial proteolytic botulinum inoculum count (EYA) was <10 spores/g. The initial proteolytic botulinum inoculum count (EYA) in the inoculated samples was 100 spores/g, 190 spores/gram, and 110 spores/gram for Samples 11-13, respectively. The results for Samples 11-13 are shown in Tables 7-9, respectively. As shown, in the absence of sorbic acid, an outgrowth of background *Bacillus* spp was observed in all three Samples after 48 hours. Indeed, due to the high background count, the test for background *Bacillus* spp was discontinued after day three and the samples were not tested for *C. botulinum* toxin. Thus, the presence of probiotic cultures alone was found to be ineffective in inhibiting background growth.

TABLE 7

| Sample 11 | $T_0$ | 2 days | 3 days | 4 days | 5 days | 6 days | 7 days |
| --- | --- | --- | --- | --- | --- | --- | --- |
| pH | 5.86 | 5.86 | 5.65 | 5.52 | 5.41 | 5.39 | 5.43 |
| Aerobic background count (BHl/30C) (cfu/g) | 10* | >1 × 10$^6$ | 5.2 × 10$^7$* | NT | NT | NT | NT |

**Bacillus* spp.
NT = Not Tested

TABLE 8

| Sample 12 | $T_0$ | 2 days | 3 days | 4 days | 5 days | 6 days | 7 days |
| --- | --- | --- | --- | --- | --- | --- | --- |
| pH | 5.92 | 5.89 | 5.76 | 5.73 | 5.68 | 5.53 | 5.46 |
| Aerobic background count (BHl/30C) (cfu/g) | 40* | >1 × 10$^6$* | 3.1 × 10$^7$* | NT | NT | NT | NT |

**Bacillus* spp.
NT = Not Tested

TABLE 9

| Sample 13 | $T_0$ | 2 days | 3 days | 4 days | 5 days | 6 days | 7 days |
| --- | --- | --- | --- | --- | --- | --- | --- |
| pH | 5.86 | 5.68 | 5.64 | 5.63 | 5.62 | 5.58 | 5.59 |
| Aerobic background count (BHl/30C) (cfu/g) | 10* | 5.1 × 10$^3$* | 3.7 × 10$^4$* | NT | NT | NT | NT |

**Bacillus* spp.
NT = Not Tested

A second set of comparison dairy product samples (Samples 14-16) were prepared with the same formula as Samples 8-10, respectively, except that 0.04% sorbic acid was included (instead of 0.1%). Additionally, Sample 17 was prepared without sorbic acid or probiotics. A third pathogen growth challenge study was conducted whereby *C. botulinum* was inoculated into the samples as a proteolytic suspension of $1.4 \times 10^5$ spores/ml and allowed to grow at 86° F. for 7 days. The initial proteolytic botulinum inoculum count (EYA) was <10 spores/g in the uninoculated samples. The initial proteolytic botulinum inoculum count (EYA) in the inoculated samples was 100 spores/g, 100 spores/gram, 110 spores/gram, and 110 spores/gram for Samples 14-17, respectively. The results for Samples 14-17 are shown in Tables 10-13, respectively.

As shown, the samples with 0.04% sorbic acid alone (Sample 14) inhibited the growth and toxin production of *C. botulinum* toxin about the same as the control sample (Sample 17), remaining toxin free through day 3 and without harming the probiotics over a long study period (12 days). In addition, the samples with 0.04% sorbic acid plus probiotics (Samples 15 and 16) were found to be significantly better at inhibiting background microflora and toxin production than either the control sample with 0.04% sorbic acid alone (Sample 14), or the control sample without sorbic acid or probiotics (Sample 17). Sample 15 remained toxin free through day 6, which represented a significant 3-day delay in toxin formation over the control samples. Sample 16 remained toxin free throughout the entire 12-day duration of the study. This demonstrates an important and surprising synergistic effect between the sorbic acid and the probiotics.

TABLE 10

| Sample 14 | $T_0$ | 2 days | 3 days | 4 days | 5 days | 6 days | 7 days | 9 days | 12 days |
|---|---|---|---|---|---|---|---|---|---|
| pH | 6.04 | 5.72 | 5.61 | 5.52 | 5.55 | 5.49 | 5.43 | 5.22 | 4.89 |
| Aerobic background count (BHI/30C) (cfu/g) | 60* | $1.4 \times 10^{5*}$ | $1.3 \times 10^{6*}$ | $>1.0 \times 10^{6*}$ | NT | NT | NT | NT | NT |
| Bioassay toxin results (− no toxin, + toxin present): | | | | | | | | | |
| Uninoculated | − | − | − | − | − | − | − | − | − |
| Proteolytic inoculated | − | − | − | + | + | + | + | + | + |

*Bacillus* spp.
NT = Not Tested

TABLE 11

| Sample 15 | $T_0$ | 2 days | 3 days | 4 days | 5 days | 6 days | 7 days | 9 days | 12 days |
|---|---|---|---|---|---|---|---|---|---|
| pH | 6.20 | 5.64 | 5.48 | 5.37 | 5.42 | 5.27 | 5.02 | 4.81 | 3.97 |
| Aerobic background count (BHI/30C) (cfu/g) | <10 | 500* | $6.6 \times 10^{3*}$ | $5.0 \times 10^{3*}$ | $3.0 \times 10^{3*}$ | $2.9 \times 10^{3*}$ | $1.7 \times 10^{5*}$ | $>1.0 \times 10^{6*}$ | $>1.0 \times 10^{6*}$ |
| Bioassay toxin results (− no toxin, + toxin present): | | | | | | | | | |
| Uninoculated | − | − | − | − | − | − | − | − | − |
| Proteolytic inoculated | − | − | − | − | − | − | + | − | + |

*Bacillus* spp.
NT = Not Tested
Pres+ = presumptively positive

TABLE 12

| Sample 16 | $T_0$ | 2 days | 3 days | 4 days | 5 days | 6 days | 7 days | 9 days | 12 days |
|---|---|---|---|---|---|---|---|---|---|
| pH | 6.15 | 5.74 | 5.67 | 5.60 | 5.62 | 5.48 | 5.30 | 5.20 | 4.47 |
| Aerobic background count (BHI/30C) (cfu/g) | <10 | <10 | 300* | 300* | $2.8 \times 10^{3*}$ | $2.3 \times 10^{4*}$ | $3.5 \times 10^{4*}$ | $1.4 \times 10^{3*}$ | 200* |
| Bioassay toxin results (− no toxin, + toxin present): | | | | | | | | | |
| Uninoculated | − | − | − | − | − | − | − | − | − |
| Proteolytic inoculated | − | − | − | − | − | − | − | − | − |

*Bacillus* spp.
NT = Not Tested

TABLE 13

| Sample 17 | $T_0$ | 2 days | 3 days | 4 days | 5 days | 6 days | 7 days | 9 days | 12 days |
|---|---|---|---|---|---|---|---|---|---|
| pH | 6.15 | 5.22 | 5.13 | 4.91 | 4.87 | 4.80 | 4.72 | 4.60 | 4.59 |
| Aerobic background count (BHI/30C) (cfu/g) | 500* | $<1.0 \times 10^{6*}$ | $<1.0 \times 10^{6*}$ | $<1.0 \times 10^{6*}$ | NT | NT | NT | NT | NT |
| Bioassay toxin results (− no toxin, + toxin present): | | | | | | | | | |
| Uninoculated | − | − | − | − | − | − | − | − | − |
| Proteolytic inoculated | − | − | − | + | + | + | + | + | + |

*Bacillus* spp.
NT = Not Tested

We claim:

1. A method of forming a dairy product comprising:
preparing a dairy composition having an aqueous continuous phase and a pH of 5.0 to about 6.2;
dispersing an effective amount of a microbial growth-inhibiting component selected from the group consisting of sorbic acid and salts thereof in an amount of about 0.03% to about 0.1% by weight in the dairy composition such that undesirable microbial growth is inhibited;
pasteurizing the dairy composition;
cooling the pasteurized dairy composition to a temperature at which a probiotic culture component can survive in the dairy composition; and
dispersing a probiotic culture component comprising probiotic cultures in the cooled dairy composition
wherein the probiotic cultures of the probiotic culture component remain substantially viable in the presence of the microbial growth-inhibiting component.

2. The method of claim 1 wherein the microbial growth-inhibiting component is dispersed in the dairy composition in an amount of about 0.04% to about 0.08% by weight of the dairy composition.

3. The dairy product of claim 1 wherein the probiotic culture component comprises probiotic cultures in an amount of about $1\times10^4$ cfu/g to about $1\times10^{10}$ cfu/g of the dairy product.

4. The method of claim 1 further comprising the step of adding one or more components selected from the group consisting of a flavor component, a fat component, a protein component, a prebiotic component, a sweetener component, a thickening component, a pH adjusting component, and combinations thereof.

5. The method of claim 1 further comprising the step of adding a fat component comprising fat in an amount of less than about 20.0% by weight of the dairy composition.

6. The method of claim 1 wherein the reduction in viable probiotic cultures of the probiotic culture component is less than about 1 log unit over about eight weeks at a temperature of less than about 45° F.

7. The method of claim 1 wherein the dairy product has a pH of at least 5.2.

8. The method of claim 1 wherein the probiotic cultures remain substantially viable in the dairy composition for about 8 weeks at a temperature of about 40° F. to about 45° F.

9. The method of claim 1 wherein the microbial growth-inhibiting component is present in an amount effective to maintain a total count of background flora in the dairy composition to within 3 log units over three days at 86° F. and inhibit the production of toxin in the dairy composition for at least 24 hours at a temperature of about 86° F. when inoculated with *C. botulinum*.

* * * * *